(12) United States Patent
Mahmoudi et al.

(10) Patent No.: US 12,393,892 B2
(45) Date of Patent: Aug. 19, 2025

(54) AUTONOMOUS VEHICLE DISPATCH BASED ON RESOURCE USAGE PREDICTIONS

(71) Applicant: GM Cruise Holdings LLC, San Francisco, CA (US)

(72) Inventors: Armin Mahmoudi, Los Gatos, CA (US); Hakan Tunc, Seattle, WA (US); Michael Rusignola, Burlingame, CA (US); Alexander H. Case, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 230 days.

(21) Appl. No.: 18/194,517

(22) Filed: Mar. 31, 2023

(65) Prior Publication Data

US 2024/0330791 A1    Oct. 3, 2024

(51) Int. Cl.
*G06Q 10/0631*    (2023.01)
(52) U.S. Cl.
CPC .............................. *G06Q 10/06311* (2013.01)
(58) Field of Classification Search
None
See application file for complete search history.

(56) References Cited

U.S. PATENT DOCUMENTS 10,152,053 B1 * 12/2018 Smith ................. G01C 21/3438
11,485,247 B2    11/2022 Ferguson et al.
2017/0162057 A1 *  6/2017 Ross .......................... G01S 17/89
2017/0163398 A1 *  6/2017 Ross .......................... H04W 4/00
2019/0197798 A1 *  6/2019 Abari ..................... G06Q 10/02
2020/0312153 A1 * 10/2020 Thakur .................. G05D 1/227
2020/0356090 A1 * 11/2020 Thakur .................. B60K 35/10

(Continued)

FOREIGN PATENT DOCUMENTS

WO    WO-2017100473 A1 *  6/2017    ......... G01C 21/3453
WO    WO-2019017991 A1 *  1/2019    ............... B60L 3/12

OTHER PUBLICATIONS

Bilal et al."Dynamic Resource Allocation for Efficient Sharing of Services from Heterogeneous Autonomous Vehicles", Dec. 2016, The University of Manchester, Manchester, England M13 9PL, UK; pp. 1-36 (Year: 2016).*

(Continued)

*Primary Examiner* — Romain Jeanty
(74) *Attorney, Agent, or Firm* — CANTOR COLBURN LLP

(57) ABSTRACT

Systems and techniques are provided for selecting and dispatching an autonomous vehicle (AV) in a set of AVs based on resource usage predictions. An example process includes receiving, from a user device, a ride request for a ride between a pick-up location and a drop-off location and determining, for each AV in a set of AVs, a predicted resource usage for a completion of the ride based on a distance between the pick-up location and the drop-off location, a distance between an AV location and the pick-up location, one or more environmental factors, and one or more vehicle-specific factors. The example process further includes selecting an AV in the set of AVs for the ride based on the predicted resource usage for the completion of the ride and a maintenance state of each AV.

20 Claims, 7 Drawing Sheets

(56) References Cited

U.S. PATENT DOCUMENTS

2021/0078441 A1* 3/2021 Okubo ............... H04L 63/0838
2022/0041186 A1* 2/2022 Michel ............... H02J 7/00306

OTHER PUBLICATIONS

Sahar et al "Fleet Management for Autonomous Vehicles:Online PDP Under Special Constraints", Dec. 2019, RAIRO-Oper. Res. 53 (2019) 1007-1031 (Year: 2019).*

Karantay "An Autonomous Vehicle Strategy For Small Ciries", Jan. 2017, pp. 1-6 (Year: 2017).*

* cited by examiner

AUTONOMOUS VEHICLE DISPATCH BASED ON RESOURCE USAGE PREDICTIONS

BACKGROUND

1. Technical Field

The present disclosure generally relates to an autonomous vehicle (AV) fleet management system. For example, aspects of the present disclosure relate to systems and techniques for dispatching an AV in a fleet of AVs based on resource usage predictions.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
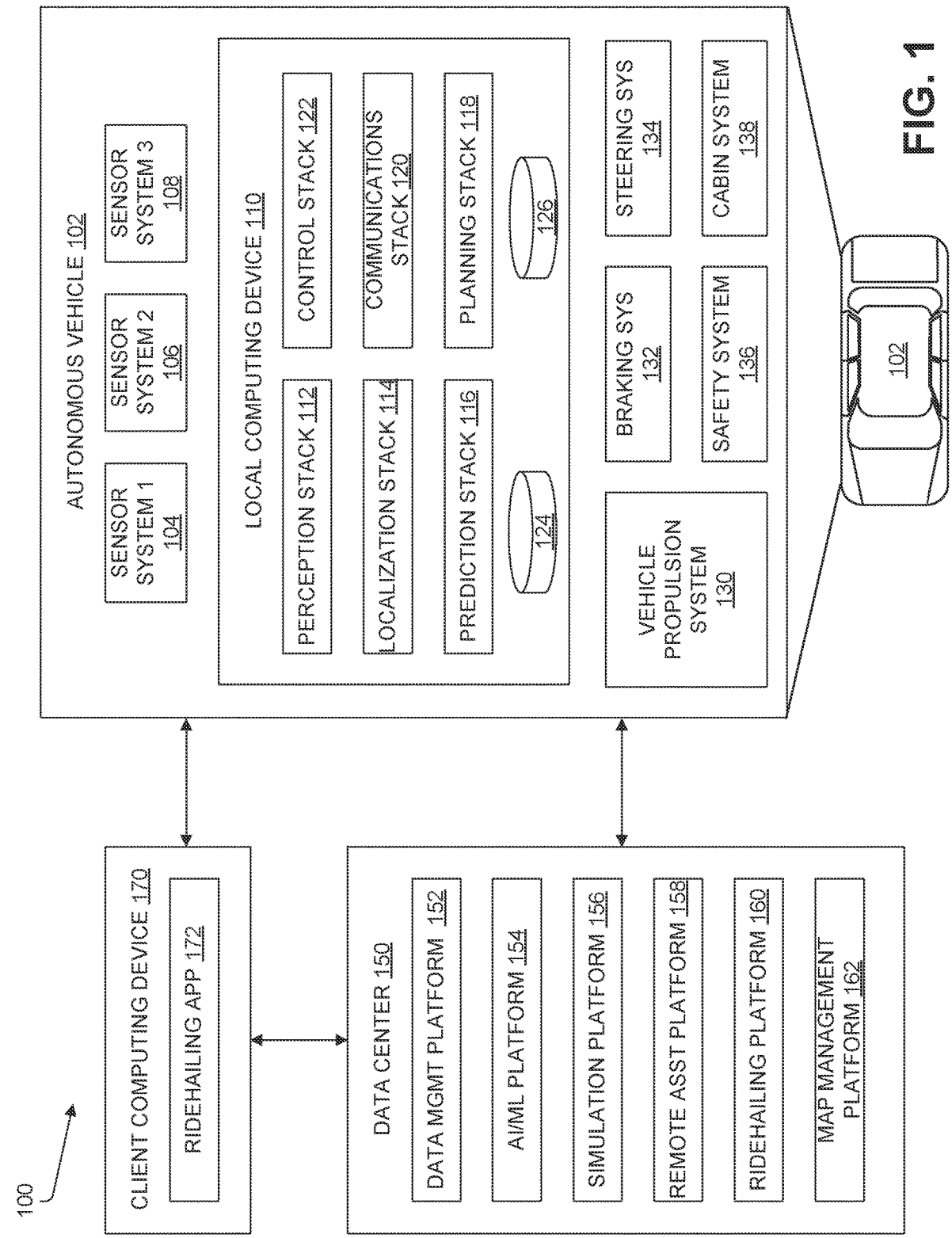
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Some ridesharing and/or ride-hailing services utilize autonomous vehicles (AVs) to transport passengers from one location to another. In contrast to conventional transportation services where a human driver picks up passengers and drives them to their destination, AVs can drive themselves, eliminating the need for a human driver. For example, upon receiving a ride request from a user/user device (e.g., a ride requestor), a fleet management system may match and dispatch an AV in one or more fleets of AVs to the user. In addition to matching and dispatching, the fleet management system is responsible for the operations and maintenance of the AVs in the fleet. In order to optimize the efficiency and safety of the fleet, the fleet management system needs to efficiently dispatch AVs to their respective tasks and routes, and manage timely and proper maintenance of the AV.

In some cases, the fleet management system matches an AV, in response to a ride request, primarily based on the distance that is required for the AV to travel. For example, the fleet management system would select an AV that is closest to a pick-up location and has enough power to complete the ride. However, even for the same distance, the total power consumption (e.g., electric energy consumption) for the completion of the ride may vary depending on various environmental and/or vehicle-specific factors. For example, a different road condition (e.g., uphill or downhill, paved or unpaved) can result in varying power consumption of an AV. In another example, an age of an AV or a battery may affect the energy efficiency and result in a different power consumption vehicle by vehicle. Furthermore, the fleet management system needs to ensure that an AV has enough resources such as disk space (or data storage capacity) and has been kept up with maintenance so that an AV does not run out of resources or break down/fail before completing the ride request.

Systems, apparatuses, processes (also referred to as methods), and computer-readable media (collectively referred to as "systems and techniques") are described herein for selecting an AV in a fleet of AVs to dispatch based on resource usage predictions. For example, the systems and techniques can match and dispatch an AV based on a predicted resource usage that may be associated with battery usage and/or data storage usage. The predicted resource usage can be determined based on various factors such as a distance between a pick-up location and a drop-off location, one or more environmental factors (e.g., a location of the AV, a road condition, a weather condition, time of day, a traffic condition, etc.) and/or one or more vehicle-specific factors (e.g., vehicle age, battery life, tire pressure, vehicle configurations, etc.). As such, the systems and techniques can intelligently and dynamically select an AV based on resource usage predictions and optimize the resource use of AVs in a fleet.

Furthermore, the systems and techniques of the present disclosure can monitor the maintenance state and/or status of AVs in a fleet so that AVs can be timely and properly maintained. For example, the systems and techniques can match and dispatch an AV in a fleet based on the maintenance state, which may be associated with data storage capacity level, remaining battery level, the remaining time until a required power cycle, the remaining time until sensor calibration, the remaining time until data offload, and so on. In some examples, the systems and techniques of the present disclosure can determine, based on the predicted resource usage for the completion of a ride request and a current maintenance state of an AV, whether an AV would need to return to a maintenance facility before and/or after the completion of the ride request. For example, the systems and techniques determine that a predicted maintenance state after the completion of the ride request would require charging of the AV, sensor calibration of the AV, offloading data of the AV, or any other type of maintenance, a trip of the AV from a drop-off location to a maintenance facility can be scheduled. As such, the systems and techniques can enable timely and proper maintenance of an AV in a fleet without manual intervention, which can prevent the risk of running out of resources or operation failures of an AV on the road.

As discussed in further detail below, various aspects of the present disclosure can be implemented (or facilitated by) a management system (e.g., fleet management system or dispatch management system) configured to make resource usage predictions based on various factors, monitor a maintenance state of each vehicle in a fleet of AVs, and dispatch an AV based on the predicted resource usage and the maintenance state to optimize the efficiency and safety of the AVs in the fleet.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear"

(e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
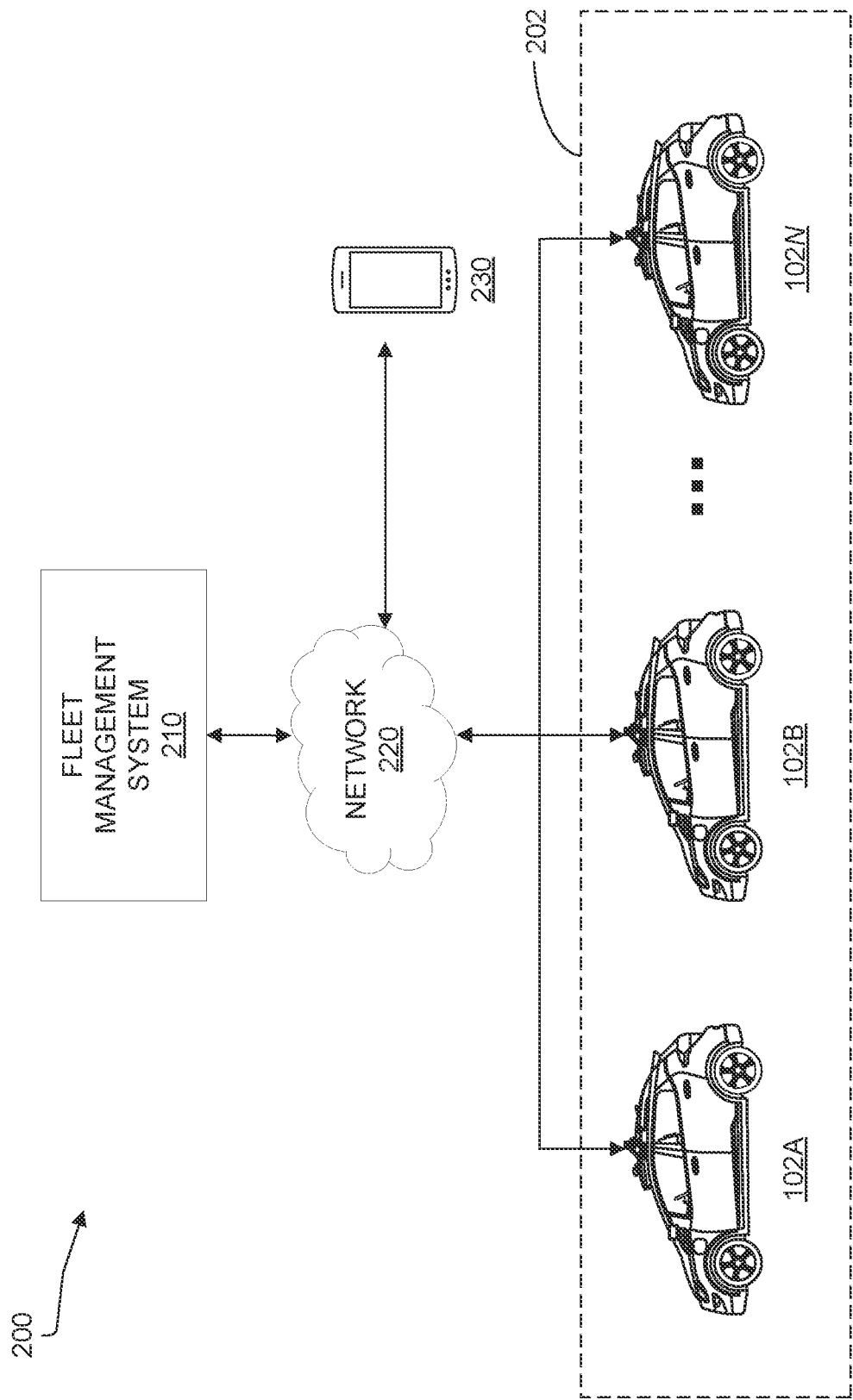
FIG. 2 illustrates a diagram of an example AV fleet management system, according to some examples of the present disclosure.

FIG. 2 illustrates a diagram of an example system environment 200 for an AV fleet management system. As shown, example environment 200 includes a fleet management system 210 that may be communicatively connected, over network 220, to a user device 230 (e.g., similar to client computing device 170 as illustrated in FIG. 1) and a fleet of AVs 202 including AV 102A, AV 102B, . . . , AV 102N. Although FIG. 2 illustrates a single fleet management system 210, a single fleet 202, a single network 220, and a single user device 230, the present disclosure can be implemented with any suitable number of fleet management systems, fleets, and/or user devices. For example, the system environment 200 may include one or more fleet management systems 210, fleets 202, networks 220, and user devices 230.

In some examples, fleet management system 210 may send and receive various signals to and from one or more AVs 102A-102N in fleet 202 and user device 230 over network 220. Non-limiting examples of network 220 can include a public network (e.g., the Internet, an IaaS network, a PaaS network, a SaaS network, other CSP network etc.), a private network (e.g., a LAN, a private cloud, a VPN, etc.), a hybrid network (e.g., a multi-cloud or hybrid cloud network, etc.), or a combination of any of the above. In some cases, fleet management system 210 may be connected to one or more types of network 220, which may be used differently when communicating with user device 230 or one or more AVs 102A-102N in fleet 202.

In some cases, each AV 102A-102N in fleet 202 is equipped with various sensors (e.g., sensor systems 104-108 as illustrated in FIG. 1) that may capture sensor data, which may be transmitted to fleet management system 210 in real-time over network 220. For example, fleet management system 210 may receive sensor data from one or more AVs 102A-102N in fleet 202 that may be collected while the AV is navigating in a real-world driving environment. In some cases, the sensor data may be descriptive of an environment around the AV that can be used to determine or verify a location, orientation, position, and/or pose of the AV, road conditions, grades of the road, traffic conditions, temperature, weather conditions, etc.

In some examples, each AV 102A-102N in fleet 202 may transmit vehicle-specific information to fleet management system 210 in real-time over network 220. The vehicle-specific information can be associated with properties, characteristics, or attributes that may be specific to the respective AV. For example, the vehicle-specific information can include, without limitation, vehicle configurations, properties of the AV (e.g., dimensions, size, weight, shape, etc.), a vehicle age, battery data (e.g., battery age, battery capacity, battery voltage, battery charge state, battery pack size, etc.), tire pressure, energy efficiency, fuel or battery efficiency, driving range, maximum and/or minimum speed, maximal torque, vehicle history (e.g., history of accidents or safety-critical events), engine temperature, ambient temperature, and so on.

In some examples, fleet management system 210 can receive various signals from any other suitable databases/data centers (e.g., data center 150 as illustrated in FIG. 1 or a third-party data store). For example, data center 150 or a third-party data system may provide the above-described data associated with AVs 102A-102N in fleet 202 (e.g., sensor data or vehicle-specific information). Further, data center 150 or a third-party data system may provide any other available data (e.g., map data, traffic data, weather data, road condition data, etc.) to fleet management system 210 over network 220.

In some aspects, each AV 102A-102N in fleet 202 may transmit maintenance information to fleet management system 210 in real-time over network 220. The maintenance information may be associated with the maintenance state and/or status of the respective AV. For example, the maintenance information can include, without limitation, battery charge level, data storage capacity level, remaining time until a required power cycle, remaining time until sensor calibration, remaining time until data offload, vehicle health-check cycle, sensor fault indications, and so on.

In some examples, fleet management system 210 may monitor the maintenance state and/or status of one or more AVs 102A-102N in fleet 202 and control any necessary and/or required maintenance of the AV(s) 102A-102N. For example, based on the current maintenance state and/or status of an AV (e.g., AV 102-102N), fleet management system 210 may schedule a trip to a maintenance facility for the AV and instruct the AV (or send instruction signals to the AV) to drive to the maintenance facility. In some aspects, the maintenance can include battery charging, sensor calibration, power cycling, offloading data, regular health check-ups, etc.

In some examples, fleet management system 210 may receive a ride request from user device 230 to transport one or more passengers from a pick-up location to a drop-off location (e.g., destination). In some cases, the ride request may include user's information such as a number of passengers, a preferred type of vehicle, a type of requested task (e.g., ridesharing and/or or ride-hailing services, food/grocery delivery, and/or parcel delivery services, etc.), driving preferences (e.g., comfort level, maximum speed, preferred speed, to avoid tolls, to avoid freeways/highways, etc.), accommodations, riding history, etc.

In some cases, fleet management system 210 is configured to match and dispatch an AV in response to a ride request received from user device 230. For example, upon receipt of a ride request from user device 230, fleet management system 210 may select an AV among one more AVs in fleet 202 based on the ride request, sensor data, vehicle-specific information, maintenance information, and/or any other available data as described above.

Figure 3:
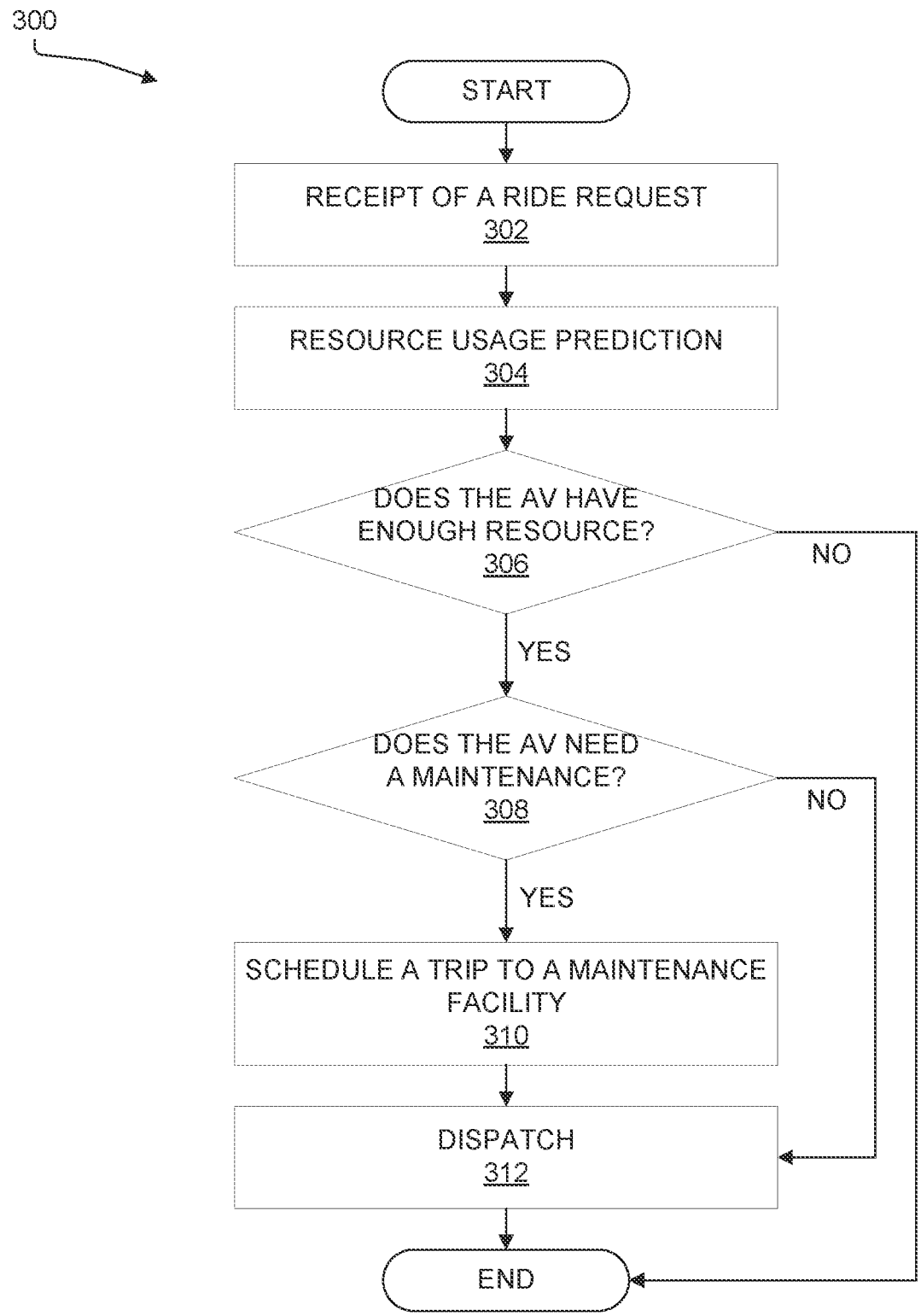
FIG. 3 illustrates a flowchart diagram illustrating an example process for dispatching an AV in a fleet of AVs based on resource usage predictions, according to some examples of the present disclosure.

FIG. 3 illustrates a flowchart diagram illustrating an example process 300 for dispatching an AV in a fleet of AVs based on resource usage predictions. In some examples, process 300 may include step 302, which includes receiving a ride request from a user device (e.g., client computing device 170 as illustrated in FIG. 1 or user device 230 as illustrated in FIG. 2). For example, a fleet management system, which is responsible for managing a fleet of AVs, can receive a ride request from a user device to transport one or more passengers from a pick-up location to a drop-off location.

In some examples, the ride request may include user's information such as a number of passengers, a preferred type of vehicle, a type of requested task (e.g., ridesharing and/or or ride-hailing services, food/grocery delivery, and/or parcel delivery services, etc.), user's preferences or driving preferences (e.g., comfort level, maximum speed, preferred speed, to avoid tolls, to avoid freeways/highways, etc.), accommodations, riding history, etc. In some aspects, the fleet management system can match an AV in a fleet of AVs and plan a route based at least in part on the user's information provided in the ride request.

In some examples, process 300 may proceed to step 304, which includes making resource usage prediction(s) for each AV in a fleet of AVs. In some cases, upon receipt of the ride request, the fleet management system may predict a level of resource usage that may be required to fulfill the ride request. In some aspects, resource usage may be associated with battery usage, data storage usage, and/or usage of any other types of resources that may be needed to complete the ride request. In some aspects, the fleet management system may determine the predicted resource usage based on a distance between the pick-up location and the drop-off location and a distance between an AV location and the pick-up location. For example, if the distance between the pick-up location and the drop-off location and/or the distance between the AV location and the pick-up location is longer, more battery would be consumed and more data storage (or more disk space) would be needed to complete the ride request.

In some aspects, the fleet management system can determine the predicted resource usage based on one or more environmental factors such as a location, orientation, position, and/or pose of the AV, road conditions, grades of the road (e.g., road surface textures), traffic conditions, temperature, weather conditions, and so on. For example, even for the same distance, driving on an uphill grade may result in more battery or power consumption compared to driving on a downhill grade or a flat terrain since an AV would need to use more power to pull the AV up the hill and incline. In another example, friction loss can impact power consumption. For example, more power consumption can be spent to overcome friction on the road. In another example, the grades of the road can affect the vehicle speed and vehicle control, which may also affect power consumption. In some examples, extreme weather conditions can have a significant impact on the driving range, and battery consumption. In another example, air turbulence may affect power consumption. In some examples, an AV would need to analyze more objects in urban environments (e.g., compared to a rural area that has less objects to detect in a scene). For example, an AV would need more data storage (e.g., disk space) when driving in urban environments as the AV needs to analyze more objects that are detected in a scene. In some aspects, the speed of an AV can impact the data storage use per minute. For example, an AV would need more data storage per minute when the AV is navigating at a higher speed compared to when the AV is driving at a lower speed. In some cases, an AV may use less disk usage at night as a camera of the AV would process less number of objects in a scene.

In some cases, the fleet management system can determine the predicted resource usage based on one or more vehicle-specific factors such as vehicle configurations, properties of the AV (e.g., dimensions, size, weight, shape, etc.), a vehicle age, a battery age or life, a data storage age or life, battery capacity, tire pressure, energy efficiency, fuel or battery efficiency, battery pack size, driving range, maximum and/or minimum speed, maximal torque, battery voltage, a history of accidents or safety-critical events, and so on. For example, a vehicle age, a battery age or life, or a data storage age or life can have an impact on a level of degradation and resource consumption efficiency. In another example, maximum and/or minimum speed or maximal torque can affect the total travel time and the total resource usage.

In some aspects, the fleet management system may comprise one or more machine learning modules or implement machine learning algorithms to generate the resource usage predictions. For example, a machine learning model can be trained to make resource usage predictions (e.g., predicted battery use or predicted data storage use). Various available data such as sensor data, vehicle-specific information, maintenance information, etc. can be fed into a machine learning model that can interpret the gathered data to predict the resource usage that may be needed to complete a ride request.

In some examples, process 300 may proceed to step 306 to determine whether the AV has enough resources to complete the ride request. In some aspects, the fleet management system may receive information associated with the maintenance state and/or status of an AV in a fleet of AVs. As previously described, one or more AVs in a fleet of AVs may transmit maintenance information associated with the current maintenance state and/or status of the respective AV such as the remaining data storage level and the remaining battery level. In some cases, the fleet management system can compare the predicted resource usage and the maintenance state and/or status of the AV and determine whether the AV has enough resources (e.g., battery and data storage) to complete the ride request. If the AV does not have enough resources to fulfill the ride request, the fleet management system can exclude the AV from a candidate pool for dispatching to the pick-up location and process 300 can end.

In some cases, if the AV has enough resources to complete the ride request, process 300 may proceed to step 308 to determine whether the AV would need maintenance (e.g., need to go to a maintenance facility) before, during, or after the completion of the ride request based on the predicted resource usage and the maintenance state of the AV. As previously described, the maintenance information received from the AV(s) in a fleet can include data storage capacity level (e.g., remaining data storage capacity), remaining battery level, remaining time until a required power cycle, remaining time until sensor calibration, remaining time until data offload, and so on. As such, the fleet management system can determine, based on the predicted resource usage and the maintenance information, whether the AV would need maintenance before, during, or after the completion of the ride request. If the AV does not need any maintenance services, process 300 may proceed to step 310.

If the AV would need maintenance services, process 300 may proceed to step 310, which includes scheduling a trip to a maintenance facility. In some cases, the fleet management system can determine, for the AV, a time to go to a maintenance facility based on the predicted resource usage for the completion of the ride request and the maintenance state and/or status of the AV. In some aspects, the fleet management system can determine that a predicted maintenance state after the completion of the ride requires a maintenance of the AV (e.g., charging of the AV, sensor calibration of the AV, power cycling of the AV, offloading data of the AV, or any other maintenance work that needs to be performed). As follows, the fleet management system can schedule a trip of the AV from the drop-off location to a maintenance facility.

In some cases, the fleet management system can select, among multiple maintenance facilities, a maintenance facility based on one or more parameters (e.g., a distance between a drop-off location and a maintenance facility, availability of charging ports, availability of proper technicians, equipment, or parts that may be needed for the maintenance, etc.). For example, if the closest maintenance facility does not have the proper equipment for the maintenance that is needed for an AV, the fleet management system may route the AV to travel to the second closest maintenance facility that may have the availability.

In some examples, process 300 may proceed to step 312, which includes the dispatch of the AV to a pick-up location. For example, the fleet management system may select an AV as described above and dispatch (or send instruction signals to) the selected AV to a pick-up location to pick up one or more passengers as requested in the ride request.

In some aspects, the fleet management system can, for a dispatch, prioritize an AV whose predicted resource usage for the completion of the ride request is substantially similar to the remaining resource usage. For example, the fleet management system can, for a dispatch, prioritize an AV whose available resource level is greater than the predicted resource usage by the smallest value among the AVs in the fleet and schedule a trip to a maintenance facility for the AV after the completion of the ride request. Rather than dispatching an AV that has 60 kWh battery for a ride request that would only require 10 kWh battery, the fleet management system can dispatch an AV that has 20 kWh battery. The AV with a higher battery capacity can be saved for a longer-distance trip. As such, the selection of an AV, among AVs in a fleet, can utilize the resource usage predictions to optimize the resource use of the AV(s) in the fleet.

Figure 4:
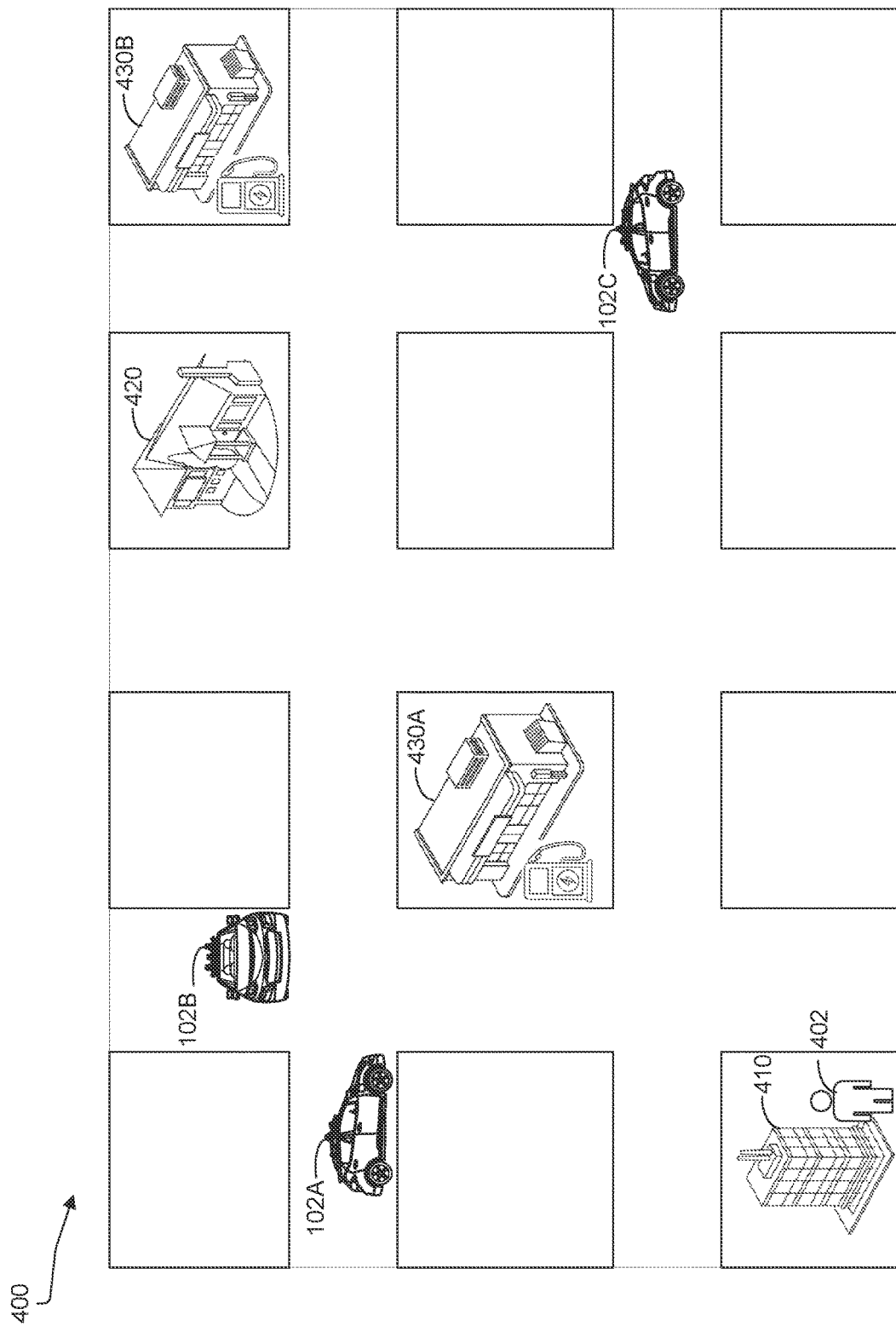
FIG. 4 illustrates a diagram illustrating an example scene for dispatching an AV in a fleet of AVs based on resource usage predictions, according to some examples of the present disclosure.

FIG. 4 illustrates a diagram illustrating an example scene 400 for dispatching an AV in a fleet of AVs based on resource usage predictions. As shown, example scene 400 includes multiple AVs 102A, 102B, 102C, a user 402 (or a ride requestor) who requested a ride between a pick-up location 410 and a drop-off location 420 (e.g., destination), and maintenance facilities 430A and 430B. As previously described, AVs 102A-102C can be part of a fleet (e.g., fleet 202), which may be managed and controlled by a fleet management system (e.g., fleet management system 210).

In some cases, once the fleet management system receives a ride request from a user device associated with a passenger 402 to transport the passenger from a pick-up location 410 to a drop-off location 420, the fleet management system can determine the predicted resource usage for each AV 102A, 102B, 102C to complete the ride request. For example, the fleet management can determine the total travel distance that is needed to complete the ride request, which would include a distance from a current location of an AV to pick-up location 410 and a distance from pick-up location 410 to drop-off location 420.

In some examples, the fleet management system can determine the predicted resource usage for each AV 102A, 102B, 102C based on one or more environmental factors including, for example without limitation, a location, orientation, position, and/or pose of the AV, road conditions, grades of the road (e.g., road surface textures), traffic conditions, temperature, weather conditions, and so on. For example, even if the distance between a location of AV 102A and pick-up location 410 may be shorter than the distance between a location of AV 102C and pick-up location 420, if the road between the location of AV 102A and pick-up location 410 is sloped and uphill, the predicted battery use for AV 102A to travel between its location to pick-up location 410 might be higher/greater than the predicted battery use for AV 102C to travel between its location to pick-up location 410.

In some aspects, the fleet management system can determine the predicted resource usage for each AV 102B, 102B, 102C based on one or more vehicle-specific factors including, for example without limitation, vehicle configurations, properties of the AV (e.g., dimensions, size, weight, shape, etc.), a vehicle age, a battery age or life, battery capacity, tire pressure, energy efficiency, fuel or battery efficiency, battery pack size, driving range, maximum and/or minimum speed, maximal torque, battery voltage, a history of accidents or safety-critical events, and so on.

In some cases, the fleet management system can determine which AV to dispatch to pick-up location 410 based on the predicted resource usage and a maintenance state and/or status of each AV. As previously described, the maintenance state and/or status can be associated with remaining battery level, data storage capacity level, remaining time until a required power cycle, remaining time until sensor calibration, remaining time until data offload, vehicle health-check cycle. For example, the fleet management system can select an AV that has enough battery and data storage as well as enough time until a required power cycle, sensor calibration, data offload, or health-check cycle so that an AV does not run out of resources or fail operations while completing the ride request.

In some examples, if the selected AV needs a maintenance after the completion of the ride request, the fleet management system may schedule a trip to maintenance facility 430A or 430B. In some cases, the fleet management system can select a maintenance facility based on one or more parameters such as a distance between drop-off location 420 and maintenance facility 430A or 430B, availability of charging ports, availability of proper technicians, equipment, or parts that may be needed for the maintenance, etc. For example, if AV 102A needs to offload data after completing the ride request and the closest maintenance facility 430 from drop-off location 420 does not have availability for offloading data, the fleet management system may instruct or schedule for AV 102A to travel to maintenance facility 430A that has availability for offloading data.

Figure 5:
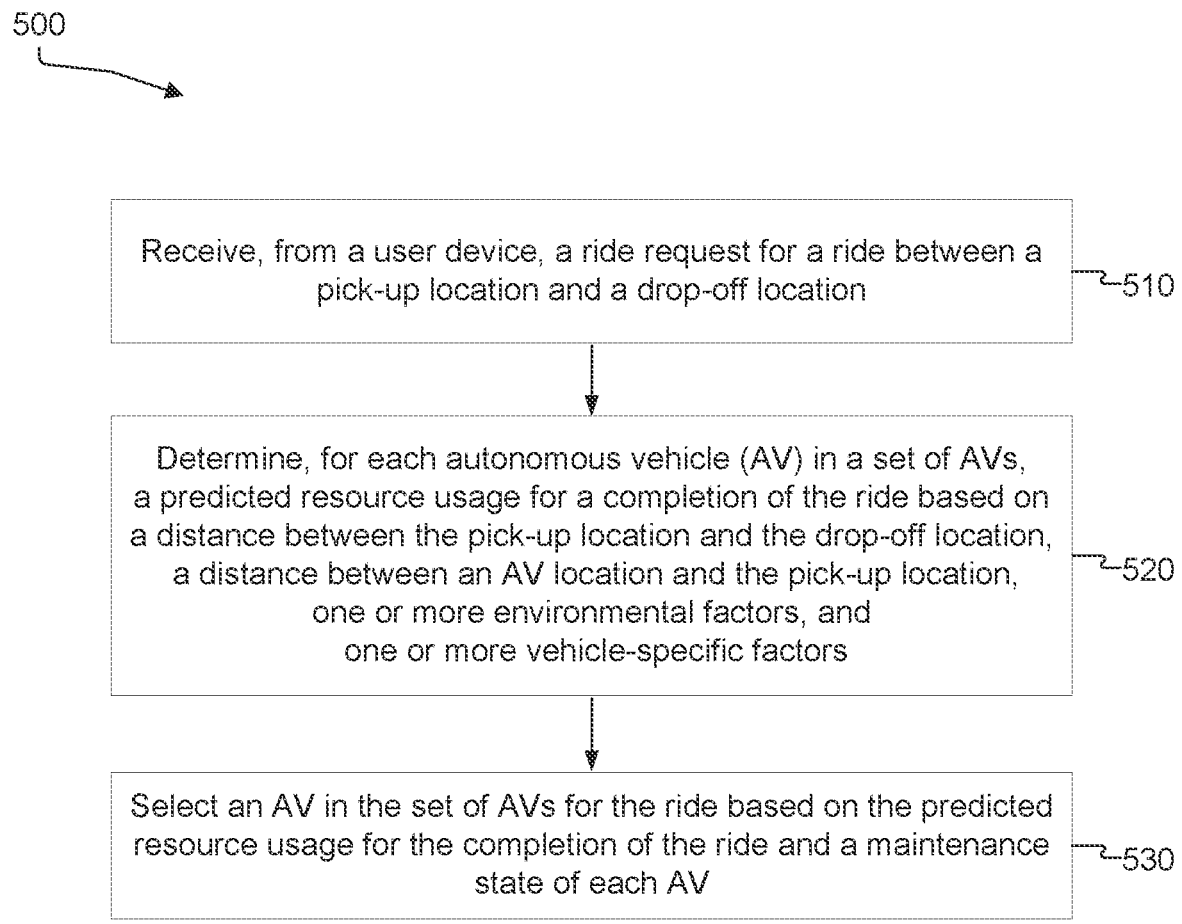
FIG. 5 illustrates a flow chart illustrating an example process for selecting an AV for a dispatch based on resource usage predictions, according to some examples of the present disclosure.

FIG. 5 is a flowchart illustrating an example process 500 for selecting an AV for a dispatch based on resource usage predictions. Although the example process 500 depicts a particular sequence of operations, the sequence may be altered without departing from the scope of the present disclosure. For example, some of the operations depicted may be performed in parallel or in a different sequence that does not materially affect the function of process 500. In other examples, different components of an example device or system that implements process 500 may perform functions at substantially the same time or in a specific sequence.

At block 510, process 500 includes receiving, from a user device, a ride request for a ride between a pick-up location and a drop-off location. For example, fleet management system 210 can receive a ride request from user device 230 (e.g., a user device associated with user 402) for a ride between pick-up location 410 and drop-off location 420 over network 220.

At block 520, process 500 includes determining, for each AV in a set of AVs, a predicted resource usage for a completion of the ride based on a distance between the pick-up location and the drop-off location, a distance between an AV location and the pick-up location, one or more environmental factors, and one or more vehicle-specific factors. For example, fleet management system 210 can determine, for each AV in fleet 202, a predicted resource usage for a completion of the ride between pick-up location 410 and drop-off location 420. In some aspects, the predicted resource usage can be associated with battery usage, data storage usage, and/or any other types of resources that may be needed to control/operate an AV.

In some examples, the predicted resource usage can be determined based on various factors including a distance between pick-up location 410 and drop-off location 420 and a distance between a location of AV (e.g., AV 102A-102N) and pick-up location 410. For example, the longer distance that the AV needs to travel to complete the ride request may require more resource consumption (e.g., more battery use, more disk space required, etc.). In another example, the shorter distance that the AV needs to travel to fulfill the ride request may result in less resource consumption (e.g., less battery use, less disk space required, etc.).

In some examples, the predicted resource usage can be determined based on one or more environmental factors (e.g., predicted usage of data storage, a road condition, a travel time, a weather condition, time of day, a traffic condition, etc.) and/or vehicle-specific factors (e.g., vehicle age, battery life, tire pressure, vehicle configurations, etc.).

At block 530, process 500 includes selecting an AV in the set of AVs for the ride based on the predicted resource usage for the completion of the ride and a maintenance state of each AV. For example, fleet management system 210 can select an AV (AV 102A-102N) in fleet 202 for the ride based on the predicted resource usage for the completion of the ride and a maintenance state of each AV (e.g., AV 102A-102N) in fleet 202.

In some aspects, the maintenance state of each AV each AV (e.g., AV 102A-102N) in fleet 202 can be associated with data storage capacity level, remaining battery level, remaining time until a required power cycle, remaining time until sensor calibration, remaining time until data offload, and so on.

In some examples, process 500 can include dispatching the AV in the set of AVs to the pick-up location. For example, the fleet management system 210 can dispatch the AV (e.g., AV 102A-102N) in fleet 202, which has been selected based on the predicted resource usage and the maintenance state, to pick-up location 410.

Figure 6:
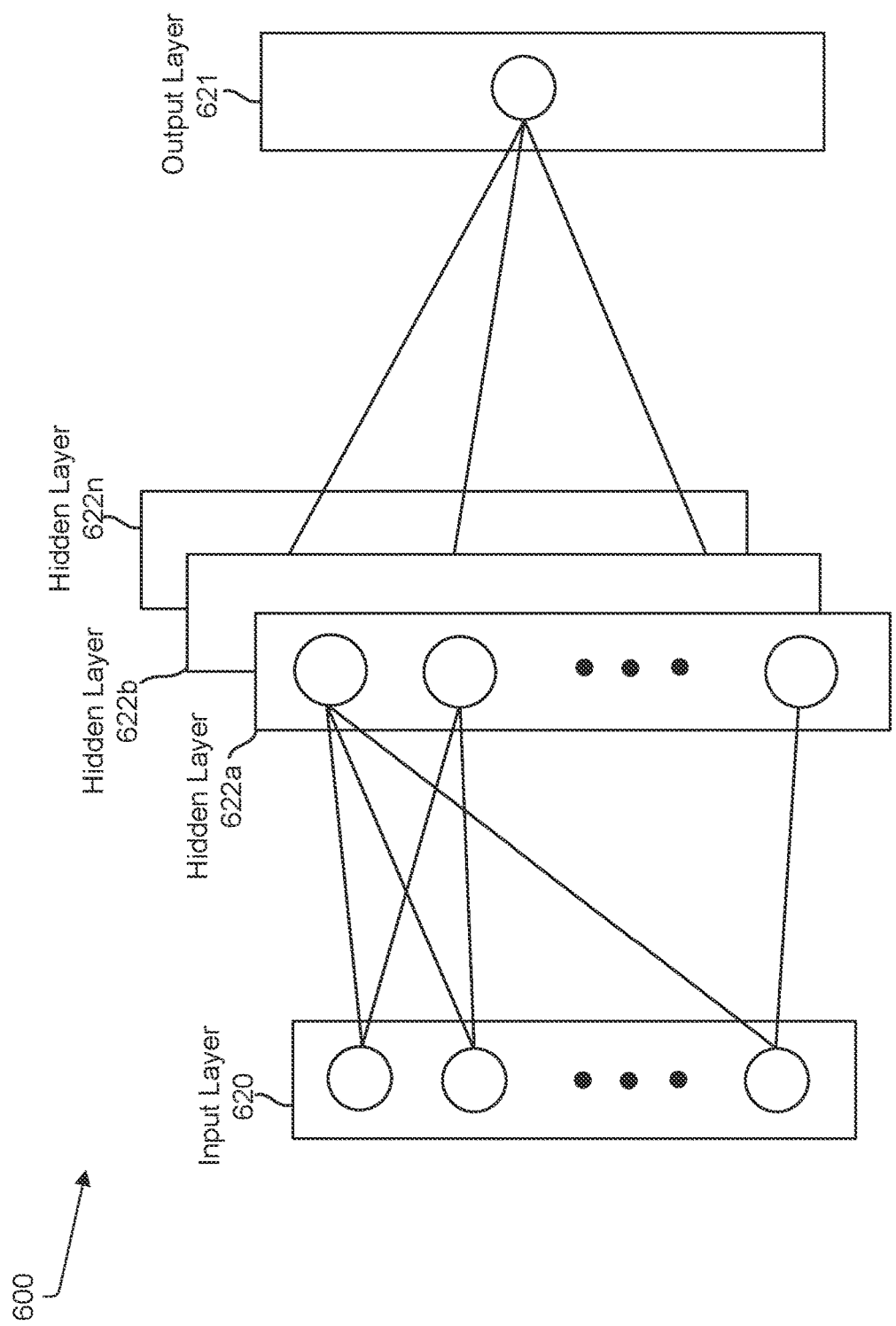
FIG. 6 illustrates an example of a deep learning neural network that can be used to implement aspects of resource usage predictions, according to some aspects of the disclosed technology.

In FIG. 6, the disclosure now turns to a further discussion of models that can be used through the environments and techniques described herein. FIG. 6 is an example of a deep learning neural network 600 that can be used to implement all or a portion of the systems and techniques described herein as discussed above (e.g., neural network 600 can be used to implement aspects of resource usage predictions). An input layer 620 can be configured to receive sensor data and/or data relating to an environment surrounding an AV. Neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. Neural network 600 further includes an output layer 621 that provides an output resulting from the processing performed by the hidden layers 622a, 622b, through 622n.

Neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2} (target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
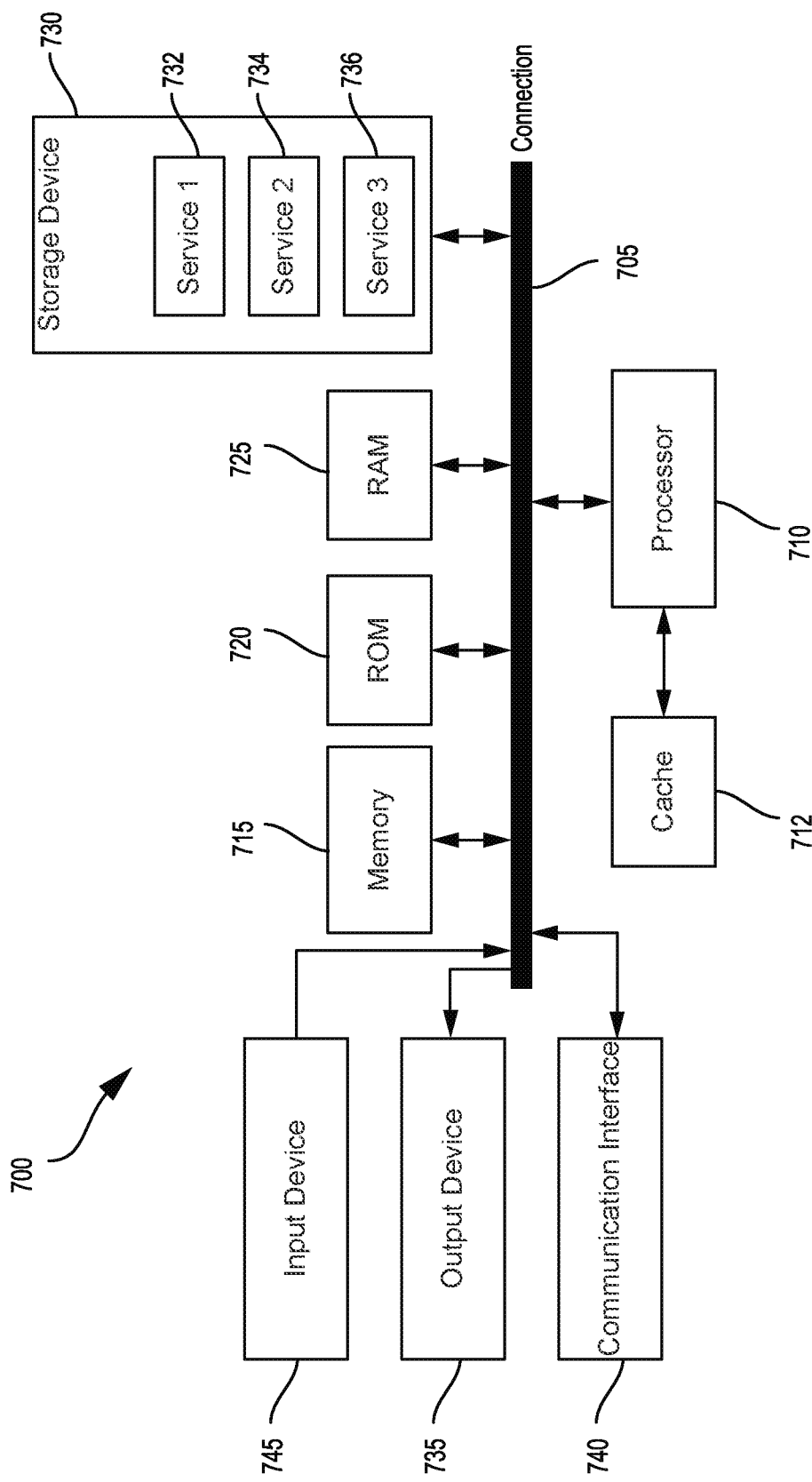
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communication interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some examples, a hardware service that performs a particular function can include the software component stored in a computer-readable medium in connection with the necessary hardware components, such as processor 710, connection 705, output device 735, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A fleet management system comprising: a memory; and one or more processors coupled to the memory, the one or more processors being configured to: receive, from a user device, a ride request for a ride between a pick-up location and a drop-off location; determine, for each autonomous vehicle (AV) in a set of AVs, a predicted resource usage for a completion of the ride based on a distance between the pick-up location and the drop-off location, a distance between an AV location and the pick-up location, one or more environmental factors, and one or more vehicle-specific factors; and select an AV in the set of AVs for the ride based on the predicted resource usage for the completion of the ride and a maintenance state of each AV.

Aspect 2. The fleet management system of Aspect 1, wherein the one or more processors are configured to: dispatch the AV in the set of AVs to the pick-up location.

Aspect 3. The fleet management system of Aspects 1 or 2, wherein the predicted resource usage is associated with battery usage and data storage usage.

Aspect 4. The fleet management system of any of Aspects 1 to 3, wherein the one or more environmental factors comprise at least one of a location of the AV, a road condition, a weather condition, time of day, and a traffic condition.

Aspect 5. The fleet management system of any of Aspects 1 to 4, wherein the one or more vehicle-specific factors comprise at least one of a vehicle age, battery life, tire pressure, and vehicle configurations.

Aspect 6. The fleet management system of any of Aspects 1 to 5, wherein the maintenance state of each AV is associated with at least one of data storage capacity level, remaining battery level, remaining time until a required power cycle, remaining time until sensor calibration, and remaining time until data offload.

Aspect 7. The fleet management system of any of Aspects 1 to 6, wherein the one or more processors are configured to: determine a time to go to a maintenance facility, for each AV in the set of AVs, based on the predicted resource usage for the completion of the ride and the maintenance state of each AV.

Aspect 8. The fleet management system of any of Aspects 1 to 7, wherein the one or more processors are configured to: determine that a predicted maintenance state after the completion of the ride requires a maintenance of the AV, wherein the maintenance includes at least one of charging of the AV, sensor calibration of the AV, power cycling of the AV, and offloading data of the AV; and schedule a trip of the AV from the drop-off location to a maintenance facility.

Aspect 9. The fleet management system of any of Aspects 1 to 8, wherein selecting the AV in the set of AVs for the ride based on the predicted resource usage for the completion of the ride and the maintenance state of each AV comprises: determining the predicted resource usage for the completion of the ride based on a level of battery charge and data storage space needed to complete the ride; determining an available resource level of the AV based on a remaining battery level and a data storage capacity level of the AV; and selecting the AV, among AVs in the set, based on the predicted resource usage and the available resource level of the AV, wherein the available resource level of the AV is greater than the predicted resource usage by a smallest value among the AVs in the set.

Aspect 10. A method comprising: receiving, from a user device, a ride request for a ride between a pick-up location and a drop-off location; determining, for each autonomous vehicle (AV) in a set of AVs, a predicted resource usage for a completion of the ride based on a distance between the pick-up location and the drop-off location, a distance between an AV location and the pick-up location, one or more environmental factors, and one or more vehicle-specific factors; and selecting an AV in the set of AVs for the ride based on the predicted resource usage for the completion of the ride and a maintenance state of each AV.

Aspect 11. The method of Aspect 10, further comprising: dispatching the AV in the set of AVs to the pick-up location.

Aspect 12. The method of Aspects 10 or 11, wherein the predicted resource usage is associated with battery usage and data storage usage.

Aspect 13. The method of any of Aspects 10 to 12, wherein the one or more environmental factors comprise at least one of a location of the AV, a road condition, a weather condition, time of day, and a traffic condition.

Aspect 14. The method of any of Aspects 10 to 13, wherein the one or more vehicle-specific factors comprise at least one of a vehicle age, battery life, tire pressure, and vehicle configurations.

Aspect 15. The method of any of Aspects 10 to 14, wherein the maintenance state of each AV is associated with at least one of data storage capacity level, remaining battery level, remaining time until a required power cycle, remaining time until sensor calibration, and remaining time until data offload.

Aspect 16. The method of any of Aspects 10 to 15, further comprising: determining a time to go to a maintenance facility, for each AV in the set of AVs, based on the predicted resource usage for the completion of the ride and the maintenance state of each AV.

Aspect 17. The method of any of Aspects 10 to 16, further comprising: determining that a predicted maintenance state after the completion of the ride requires a maintenance of the AV, wherein the maintenance includes at least one of charging of the AV, sensor calibration of the AV, power cycling of the AV, and offloading data of the AV; and scheduling a trip of the AV from the drop-off location to a maintenance facility.

Aspect 18. The method of any of Aspects 10 to 17, further comprising: predicting a user demand for one or more ride requests associated with the set of AVs based on historical data; and scheduling a trip of the AV from the drop-off location to a maintenance facility based on the user demand.

Aspect 19. A non-transitory computer-readable storage medium comprising at least one instruction for causing a computer or processor to perform method according to any of Aspects 10 to 18.

Aspect 20. A computer-program product comprising instructions which, when executed by one or more processors, cause the one or more processors to perform a method according to any of Aspects 10 to 18.

What is claimed is:

1. A fleet management system comprising:
a memory; and
one or more processors coupled to the memory, the one or more processors being configured to:
receive in real time sensor data from sensor systems of autonomous vehicles (AVs) navigating through a dynamic environment without a human driver;
wherein the sensor data is received at a sufficient volume and in sufficient variety to determine AV resource usage and a maintenance state of each of the AVs;
use the sensor data to determine the maintenance state of each of the AVs;
receive, from a user device, a ride request for a ride between a pick-up location of the ride and a drop-off location of the ride;
use the sensor data to determine, for each of the AVs, a predicted AV resource usage for a completion of the ride based on a distance between the pick-up location of the ride, the drop-off location of the ride, a distance between an AV location and the pick-up location of the ride, one or more environmental factors associated with the ride, and one or more vehicle-specific factors associated with the ride; and select a selected AV from among the AVs for the ride based on the predicted AV resource usage for the completion of the ride and the maintenance state of each of the AVs.

2. The fleet management system of claim 1, wherein the one or more processors are configured to:
dispatch the selected AV to the pick-up location of the ride.

3. The fleet management system of claim 1, wherein the predicted AV resource usage is associated with battery usage and data storage usage.

4. The fleet management system of claim 1, wherein the one or more environmental factors comprise at least one of the AV location, a road condition, a weather condition, time of day, and a traffic condition.

5. The fleet management system of claim 1, wherein the one or more vehicle-specific factors comprise at least one of a vehicle age, battery life, tire pressure, and vehicle configurations.

6. The fleet management system of claim 1, wherein the maintenance state of each of the AVs is associated with at least one of data storage capacity level, remaining battery level, remaining time until a required power cycle, remaining time until sensor calibration, and remaining time until data offload.

7. The fleet management system of claim 1, wherein the one or more processors are configured to:
determine a time to go to a maintenance facility, for each of the AVs, based on the predicted AV resource usage for the completion of the ride and the maintenance state of each of the AVs.

8. The fleet management system of claim 1, wherein the one or more processors are configured to:
determine that a predicted maintenance state after the completion of the ride requires a maintenance of the selected AV, wherein the maintenance includes at least one of charging of the selected AV, sensor calibration of the selected AV, power cycling of the selected AV, and offloading data of the of the selected AV; and schedule a trip of the selected AV from the drop-off location to a maintenance facility.

9. The fleet management system of claim 1, wherein selecting the selected AV from among the AVs for the ride based on the predicted AV resource usage for the completion of the ride and the maintenance state of each of the AVs comprises:
determining the predicted AV resource usage for the completion of the ride based on a level of battery charge and data storage space needed to complete the ride;
determining an available resource level of the AVs based on a remaining battery level and a data storage capacity level of each of the AVs; and
selecting the selected AV from among the AVs based on the predicted AV resource usage and the available resource level of the selected AV, wherein the available resource level of the selected AV is greater than the predicted AV resource usage by a smallest value among the AVs.

10. A computer-implemented method comprising:
using a processor system to receive in real time sensor data from sensor systems of autonomous vehicles (AVs) navigating through a dynamic environment without a human driver;
wherein the sensor data is received at a sufficient volume and in sufficient variety to determine AV resource usage and a maintenance state of each of the AVs;
wherein the processor system uses the sensor data to determine the maintenance state of each of the AVs;
using the processor to receive, from a user device, a ride request for a ride between a pick-up location of the ride and a drop-off location of the ride;
using the processor system to determine, for each of the AVs, a predicted AV resource usage for a completion of the ride based on a distance between the pick-up location of the ride, the drop-off location of the ride, a distance between an AV location and the pick-up location of the ride, one or more environmental factors associated with the ride, and one or more vehicle-specific factors associated with the; and
using the processor system to select a selected AV from among the AVs for the ride based on the predicted AV resource usage for the completion of the ride and the maintenance state of each AV.

11. The computer-implemented method of claim 10, further comprising:
using the processor system to dispatch the selected AV the pick-up location of the ride.

12. The computer-implemented method of claim 10, wherein the predicted AV resource usage is associated with battery usage and data storage usage.

13. The computer-implemented method of claim 10, wherein the one or more environmental factors comprise at least one of the AV location, a road condition, a weather condition, time of day, and a traffic condition.

14. The computer-implemented method of claim 10, wherein the one or more vehicle-specific factors comprise at least one of a vehicle age, battery life, tire pressure, and vehicle configurations.

15. The computer-implemented method of claim 10, wherein the maintenance state of each of the AVs is associated with at least one of data storage capacity level, remaining battery level, remaining time until a required power cycle, remaining time until sensor calibration, and remaining time until data offload.

16. The computer-implemented method of claim 10, further comprising:
using the processor system to determine a time to go to a maintenance facility, for of the AVs, based on the predicted AV resource usage for the completion of the ride and the maintenance state of each of the AVs.

17. The computer-implemented method of claim 10, further comprising:
using the processor system to determine that a predicted maintenance state after the completion of the ride requires a maintenance of the predicted AV, wherein the maintenance includes at least one of charging of the AV, sensor calibration of the AV, power cycling of the AV, and offloading data of the AV; and scheduling a trip of the AV from the drop-off location to a maintenance facility.

18. The computer-implemented method of claim 10, further comprising:
using the processor system to predict a user demand for one or more ride requests associated with the set of AVs based on historical data; and
using the processor system to schedule a trip of the selected AV from the drop-off location of the ride to a maintenance facility based on the user demand.

19. A non-transitory computer-readable storage medium comprising at least one instruction for causing a computer or processor to:

receive in real time sensor data from sensor systems of autonomous vehicles (AVs) navigating through a dynamic environment without a human driver;

wherein the sensor data is received at a sufficient volume and in sufficient variety to determine AV resource usage and a maintenance state of each of the AVs;

use the sensor data to determine the maintenance state of each of the AVs;

receive, from a user device, a ride request for a ride between a pick-up location of the ride and a drop-off location of the ride;

using the sensor data to determine, for each of the AVs, a predicted AV resource usage for a completion of the ride based on a distance between the pick-up location of the ride, and the drop-off location of the ride, a distance between an AV location and the pick-up location of the ride, one or more environmental factors associated with the ride, and one or more vehicle-specific factors associated with the ride; and select a selected AV from among the AVs for the ride based on the predicted AV resource usage for the completion of the ride and the maintenance state of each of the AVs.

20. The non-transitory computer-readable storage medium of claim 19, wherein the at least one instruction causes the computer of processor to:

dispatch the selected AV to the pick-up location of the ride.

* * * * *